J. BLOCHER.
Axle.
No. 63,358. Patented Apr. 2, 1867.
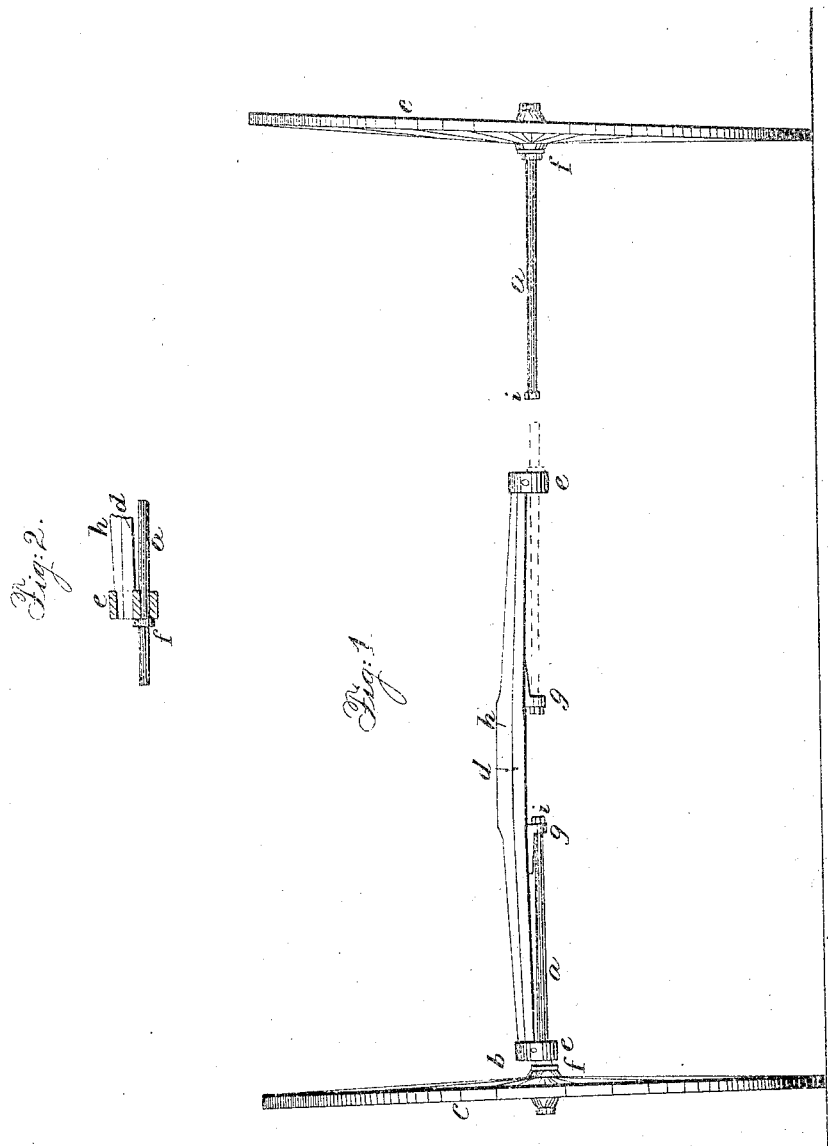
Witnesses
Jay Hyatt
Charles J. Hamlin
Inventor.
John Blocher
Per J Fraser & Co. Att'ys

United States Patent Office.

JOHN BLOCHER, OF BUFFALO, NEW YORK.

Letters Patent No. 63,358, dated April 2, 1867.

---

IMPROVEMENT IN RUNNING GEAR OF LAND CARRIAGES.

---

The Schedule referred to in these Letters Patent and making part of the same.

---

TO ALL WHOM IT MAY CONCERN:

Be it known that I, JOHN BLOCHER, of the city of Buffalo, in the county of Erie, and State of New York, have invented a new and useful Improvement in the Running Gear of Land Carriages; and I do hereby declare that the following is a full and exact description, reference being had to the accompanying drawings, in which—

Figure 1 is an elevation of my improved axle, showing one wheel with its journal removed.

Figure 2, a vertical section through the solid clip and end box with a portion of the axle.

Like letters indicate corresponding parts in both figures.

My invention consists in the combination of a fixed shaft or arbor with each of the wheels of land carriages, and connecting the same with the usual axle by means of boxes, in such a manner that each wheel has an independent motion; and also in making the end bearings serve the double purpose of a clip, which is immovable when the wheel is on, and a box for the journal of the wheel.

I construct my wheels in the usual manner, except that instead of setting a box in the hub to receive and turn upon the arm of the axle, in place thereof I affix rigidly a short arm or shaft, $a$, as represented in the drawings, $b$ being the hub of the wheel C. These shafts are hung in bearings parallel with the main axle $d$, which is of ordinary construction, except in not being provided with the usual arms for the wheel, the outer or end bearings $e$ forming both a box for the shaft and a clip for the parts of the main axle, as will be hereafter described. The shaft $a$ is provided with a collar, $f$, close to the hub, which fits against the box $e$ and prevents it from sliding toward the centre of the vehicle. Toward the middle of the main axle a small hanger, $g$, is provided, large enough to receive the opposite end of the shaft $a$, which passes through it, and is secured therein by a nut, $i$. Thus the collar $f$ and nut being on opposite sides of the two boxes $e$ $g$, secure the shaft against endwise motion, and aid in accomplishing one of the objects of my improvement, viz, to cause the wheels to run steady and true, and track perfectly. The shafts $a$ $a$ may be connected with the wheel in any manner that will be rigid and permanent, and are preferably made to diminish in size from the bearing $e$ to the other extremity, where the strain on them is less. The boxes $e$ and $g$ are provided with orifices for receiving oil, so that the wheel does not have to be removed from the vehicle for that purpose. These bearings are small, and the journals fit accurately in them, so that the wheels run perfectly and steadily, and less friction occurs than in the ordinary method, because the journals of each wheel have much less superficial area than is contained in the hub box of an ordinary wheel.

It is well known that the arm or journal of carriage axles is liable to break, and that the fracture usually occurs near the shoulder. This is due to the fact that the arms require to have considerable play in the boxes in order to run easy when there is so much friction surface, the journal of light carriages being usually eight to ten inches long. The wheels, in travelling, strike stones and other resisting objects with great force, owing to their momentum, and this force reacts suddenly on the journal from the slight space in the box, producing a severe blow or strain, which is often exerted in an oblique or twisting direction from the inequality of road obstructions. The frequent repetition of these concussive strains finally results in the fracture of the arm. By my construction this effect is obviated, first, by the wheel running so truly in its bearings, without play, that it will at once rise and pass over ordinary obstructions; second, that there being no play between the parts the concussion cannot be produced with the same force as the resistance offered to the wheel, the shock partially losing its force through the inertia of the material; third, the shaft $a$ having two bearings with some distance between them, there is a chance for the metal to spring or yield slightly between the two under a sudden concussion, and thereby diminish its force. The main axle also derives advantages of strength and resistance from this arrangement in consequence of the weight and strains being more equally distributed through several points of bearing. By this improvement I also accomplish a desirable result in securing the parts composing the axle together by the end clips $e$ $e$. These clips being usually held on by bolts, the nuts of which work loose and often drop off, it is difficult to keep the iron axle $d$ and its wood parts firmly together. This I fully accomplish by making the clip $e$, consisting of a single piece of metal without bolts, serve the purpose of a box for the shaft $a$, the collar of which, bearing constantly against it, and being drawn in the direction by the nut $i$, which holds the wheel on, prevents the possibility of its working off. This effect may be increased by making the clip somewhat wedging in shape.

What I claim as my invention, is—

In combination with the revolving wheel shafts $a$ and axle $d$, the clip $e$, and collar $f$, and nut $i$, arranged and operating substantially in the manner and for the purposes set forth.

In witness whereof I have hereunto signed my name in the presence of two subscribing witnesses.

JOHN BLOCHER.

Witnesses:
  JAY HYATT,